Figure 1:
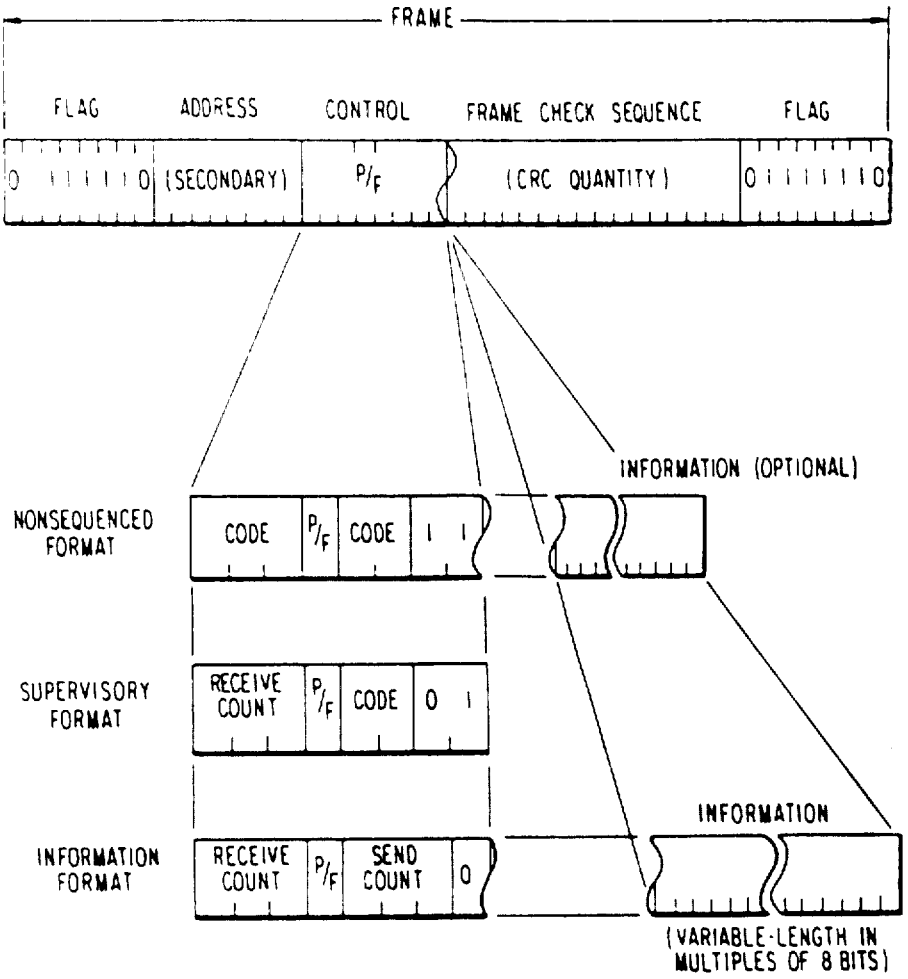
Figure 2:
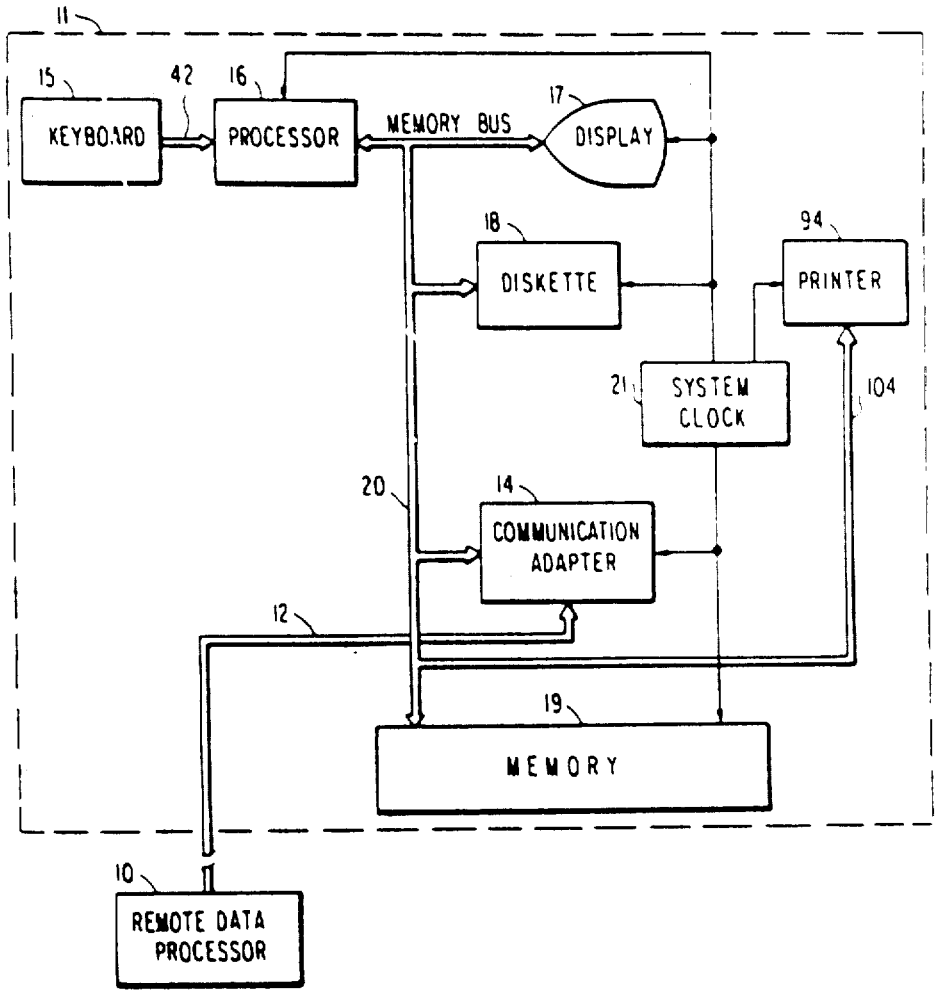
Figure 3:
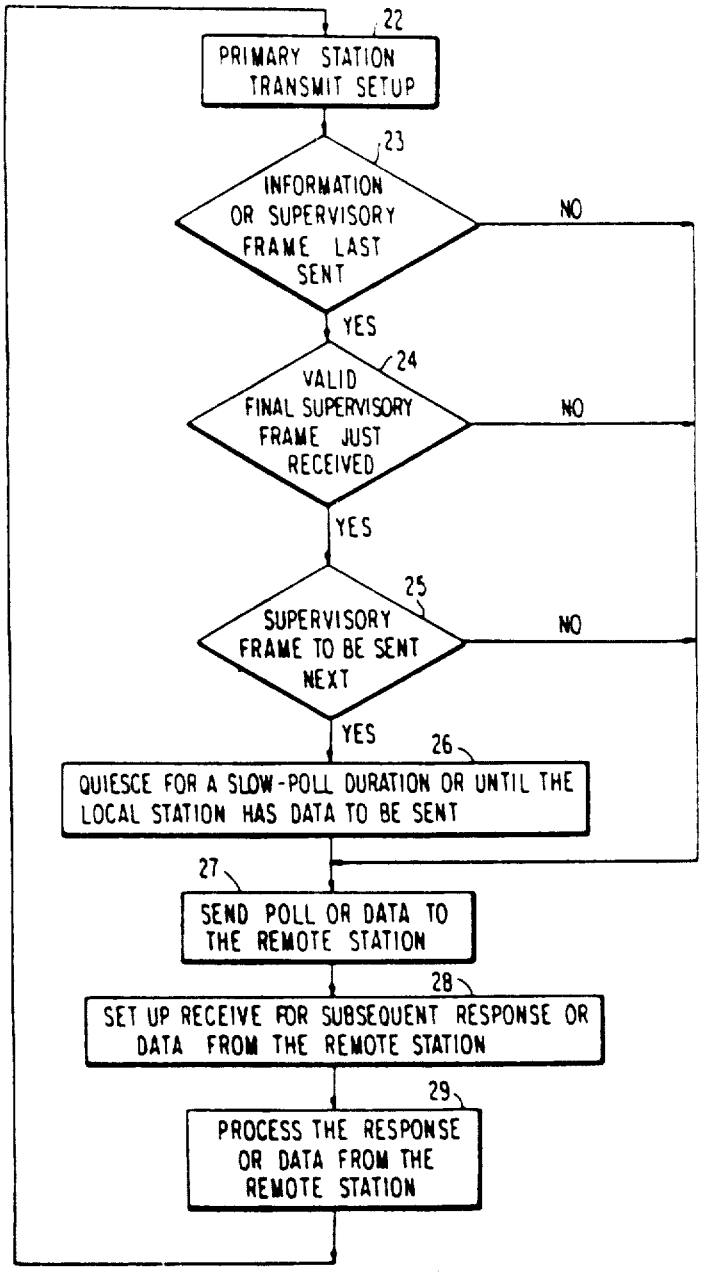

United States Defensive Publication [19] (H) [11] T104,003

Hall et al. [43] Mar. 6, 1984

[54] SYNCHRONOUS DATA LINK SLOW-POLL PROTOCOL

[76] Inventors: Lon E. Hall, 8413 Maine Dr., Austin, Tex. 78758; Richard E. Eveland, 11214 Deadoak La., Austin, Tex. 78759

[21] Appl. No.: 440,263

[22] Filed: Nov. 9, 1982

[51] Int. Cl.[3] ..... G06F 3/00

[52] U.S. Cl. ..... 364/200; 340/825.08; 370/96; 370/90; 375/106; 371/2

[57] ABSTRACT

A first data processor (10) and at least a second data processor (11) are connected by a data link (12). The processors each have a communication adapter (14) which is connected to the data link and system clock (21) which times functions within the processor. Under a synchronous data link control (SDLC) protocol which has information frames and supervisory frames, one of the processors is designated as the primary station and the other, the secondary station. Whenever supervisory frames are transmitted between the primary and secondary stations, means are operative for inserting a mandatory non-polling quiet period of a predetermined length prior to each poll so that the processor at the secondary station is freed for non-polling functions.

10 Claims, 3 Sheets Drawing,

13 Pages Specification

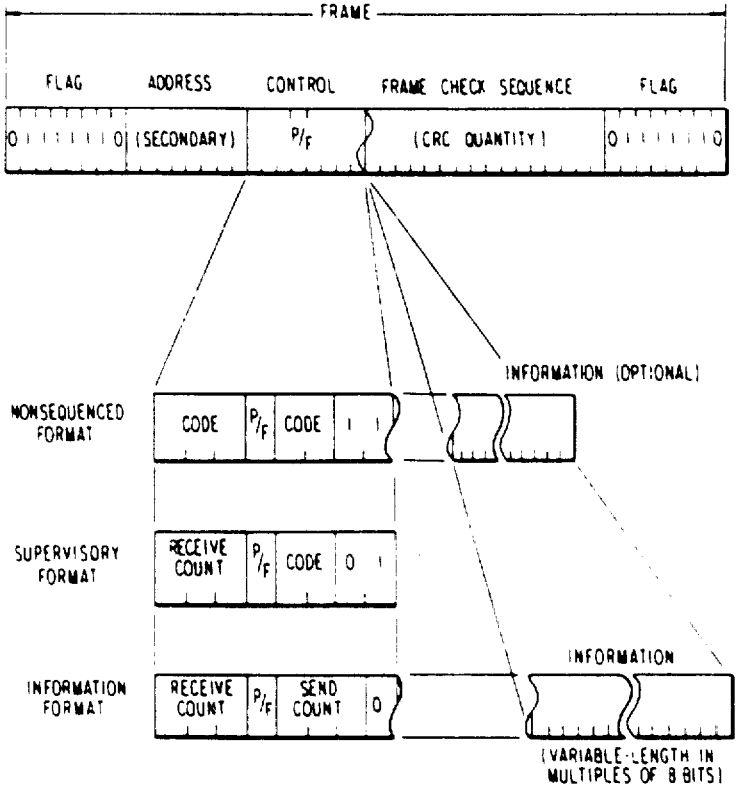

The file of this unexamined application may be inspected and copies thereof may be purchased (849 O.G. 1221, Apr. 9, 1968)